United States Patent
Tanaka et al.

(10) Patent No.: US 10,412,982 B2
(45) Date of Patent: Sep. 17, 2019

(54) METHOD FOR PRODUCING INSTANT NOODLES

(71) Applicant: NISSIN FOODS HOLDINGS CO., LTD., Osaka-shi, Osaka (JP)

(72) Inventors: Mitsuru Tanaka, Osaka (JP); Yoshifumi Miyazaki, Osaka (JP); Takuo Nakazeko, Osaka (JP)

(73) Assignee: Nissin Foods Holdings Co., Ltd., Osaka (JP)

( * ) Notice: Subject to any disclaimer, the term of this patent is extended or adjusted under 35 U.S.C. 154(b) by 0 days.

(21) Appl. No.: 15/039,745

(22) PCT Filed: Nov. 28, 2014

(86) PCT No.: PCT/JP2014/081547
§ 371 (c)(1),
(2) Date: May 26, 2016

(87) PCT Pub. No.: WO2015/080247
PCT Pub. Date: Jun. 4, 2015

(65) Prior Publication Data
US 2016/0374376 A1   Dec. 29, 2016

(30) Foreign Application Priority Data
Nov. 28, 2013   (JP) .................. 2013-245893

(51) Int. Cl.
*A23L 7/113* (2016.01)
*A21C 9/02* (2006.01)

(52) U.S. Cl.
CPC .............. *A23L 7/113* (2016.08); *A21C 9/02* (2013.01); *A23V 2002/00* (2013.01)

(58) Field of Classification Search
USPC ....................................................... 426/557
See application file for complete search history.

(56) References Cited

U.S. PATENT DOCUMENTS

| | | | |
|---|---|---|---|
| 2011/0129582 A1 | 6/2011 | Miyazaki et al. | |
| 2012/0207897 A1 | 8/2012 | Ishii et al. | |
| 2012/0288607 A1 | 11/2012 | Takahashi | |

FOREIGN PATENT DOCUMENTS

| | | |
|---|---|---|
| GB | 2 112 622 | 7/1983 |
| JP | 59-82061 | 5/1984 |
| JP | 59-88055 | 5/1984 |
| JP | 2003-038114 | 2/2003 |
| JP | 2003-174853 | 6/2003 |
| JP | 3535145 | 6/2004 |
| JP | 2011-130687 | 7/2011 |
| JP | 2012-060998 | 3/2012 |
| WO | 2011/013185 | 2/2011 |

OTHER PUBLICATIONS

Pronyk, et al., "Optimum Processing Conditions of Instant Asian Noodles in Superheated Steam", Drying Technology, vol. 26, No. 2, Jan. 31, 2008, pp. 204-210.
Extended European Search Report issued in corresponding European Patent Application No. 14866382.6, dated Apr. 21, 2017, 10 pages.
Notification of Reasons for Refusal issued in corresponding Japanese patent application No. 2013-245893, dated Jun. 15, 2017, 6 pages with an English translation.
Taiwanese Office Action issued for Application No. 103141370, dated Feb. 23, 2016, 7 pages with translation.
Information Offer Form issued in corresponding Japanese patent application with a partial English Translation, dated Sep. 26, 2016, 13 pages.
Office Action issued in corresponding Russian Patent Application No. 2016125632, dated Feb. 7, 2018, 10 pages with an English translation.
Notification of Reasons for Refusal issued in corresponding Japanese Patent Application No. 2013-245893, dated Jan. 10, 2018, 9 pages with an English translation.
Office Action issued in corresponding European Patent Application No. 14866382.6, dated May 22, 2019, 4 pages.

*Primary Examiner* — Lien T Tran
(74) *Attorney, Agent, or Firm* — Hamre, Schumann, Mueller & Larson, P.C.

(57) ABSTRACT

This application provides a method for producing instant noodles having fresh noodle-like flavor and texture. The method for producing instant noodles comprises a heat treatment of noodle strings under specific conditions, such as specific temperature and humidity. Particularly, the method for producing instant noodles comprises the step of carrying out a heating process at an intra-chamber temperature of 130 to 220° C., where the heating process is carried out in an atmosphere of −5% to +10% of the absolute humidity of steam under atmospheric pressure at the temperature.

9 Claims, No Drawings

METHOD FOR PRODUCING INSTANT NOODLES

TECHNICAL FIELD

The present invention relates to a method for producing instant noodles. More specifically, the present invention relates to a method for producing instant noodles, comprising the step of carrying out a heating process at a particular temperature and humidity.

BACKGROUND ART

Instant noodles are excellent in long-term storage property because of having a very low moisture content and being in a dry state.

Also, the instant noodles can be eaten by cooking which merely involves dipping the instant noodles in boiling water and allowing to stand for a few minutes or boiling them in boiling water for about 1 to a few minutes for reconstitution, and thus, are very highly convenient food products.

In general, the instant noodles are made of cereal flour, such as wheat flour, as a main raw material. In production steps, raw noodle strings are subjected to the gelatinization of starch contained therein and then dried. For example, a method of steaming the noodle strings with saturated steam for gelatinization, followed by drying is frequently used.

As consumer tastes have been diversified in recent years, there has been a growing demand for authenticity-oriented instant noodles, such as a demand for straight noodles or a demand for flavor and texture closer to those of fresh noodles.

In this context, the "fresh noodle-like" flavor and texture are comprehensively judged from biting texture at the surface of noodle strings, firmness remaining in the cores of noodle strings when fresh noodles are cooked, the elasticity of noodles, the aroma of noodles, etc. Therefore, noodles that have good outcomes at any one of these items, but do not satisfy the other items are rarely regarded as being "fresh noodle-like".

In the case of steaming noodle strings with saturated steam, the fresh noodle-like flavor and texture are difficult to obtain. This is because, unlike the boiling of raw noodle strings, the steaming does not allow water to enter the noodle strings for the progression of gelatinization, and also applies heat to the noodle strings in a different manner. The resulting steamed noodle strings differ in flavor and texture, such as biting texture, the elasticity of noodles, or the aroma of noodles, from the cooking of raw noodle strings.

Meanwhile, a technique of adding a texture improver is disclosed as another method for conferring flavor and texture close to those of fresh noodles using saturated steam (see PTL 1). This technique improves elasticity, palatability, and the like by adding the texture improver.

CITATION LIST

Patent Literature

PTL 1: Japanese Laid-Open Patent Application Publication No. 2000-236829

SUMMARY OF INVENTION

Technical Problem

Although the technique described in PTL 1 improves texture by adding the texture improver, this technique is still insufficient for improving the other factors for judging the "fresh noodle-like" flavor and texture. In addition, the texture improver is costly and therefore disadvantageously increases the price of final products.

An object of the present invention is to provide, in light of the current situation, a method for producing instant noodles having fresh noodle-like flavor and texture.

Solution to Problem

As a result of diligent studies on a method for producing instant noodles having fresh noodle-like flavor and texture, the present inventors have found that fresh noodle-like flavor and texture are obtained by the step of carrying out a heating process under particular temperature and humidity conditions, and the present inventors consequently completed the present invention.

Specifically, the present invention provides a method for producing instant noodles, comprising the step of carrying out a heating process in a chamber at an intra-chamber temperature of 130° C. to 220° C., wherein the heating process is carried out in an atmosphere of −5% to +10% of the absolute humidity of steam under atmospheric pressure at the temperature.

The present invention also provides a method for producing instant noodles, comprising the step of making raw noodle strings, the step of carrying out a heating process of the cut raw noodle strings, and the step of drying the noodle strings after the heating process, wherein the step of carrying out a heating process is performed a plurality of times, and the initial step of carrying out a heating process is performed in a chamber at an intra-chamber temperature of 130° C. to 220° C. in an atmosphere of −5% to +10% of the absolute humidity of steam under atmospheric pressure at the temperature.

In the present invention, the time of the heating process is preferably within 5 seconds to 90 seconds.

Advantageous Effects of Invention

The production method of the present invention can produce elastic instant noodles that have texture close to that of fresh noodles and having the soft surface of noodle strings and the firm cores of the noodle strings, as compared with conventionally produced instant noodles. The production method of the present invention is also excellent in terms of flavor and produces noodles having wheat flour flavor. When the noodles to be produced are Chinese noodles, the production method of the present invention enhances their unique aroma including so-called kansui odor.

DESCRIPTION OF EMBODIMENTS

Hereinafter, the method for producing instant noodles according to the present invention will be specifically described.

The noodle strings of the present invention are produced by subjecting fresh noodles formed by an ordinary method to a heating process, etc., mentioned later.

(Prior to Step of Carrying Out Heating Process)

In the present invention, first, raw noodle strings are prepared by an ordinary method. Specifically, sub material(s) and kneading water are added to a raw material powder, such as wheat flour, and the mixture can be kneaded, then combined, rolled out, and cut to prepare raw noodle strings. Instead of cutting, the noodle strings may be produced by extruding the mixture using an extruder or the like. Wheat flour, starch, or the like is used as the main raw material powder. Kansui, salt, a thickener, gluten, albumen, a dye, vitamin, calcium, etc. can be added, if necessary, as the sub material(s).

Examples of the thickness of the noodle strings of the present invention can include, but are not particularly limited to, a thickness ranging from 0.6 to 3.0 mm.

(Step of Carrying Out Heating Process)

Subsequently, the prepared raw noodle strings are subjected to a heating process. The heating process in the present invention is carried out by exposing the noodle strings to a high-temperature fluid for a short time. A feature of the heating process is that the absolute humidity falls within a particular range. The heating step of the present invention may be performed a plurality of times. A further feature is that the initial heating process is carried out in particular temperature and humidity ranges.

In this context, examples of the "high-temperature fluid" described herein include, but are not limited to, high-temperature air and high-temperature steam.

The temperature of the high-temperature fluid used in the present invention is preferably in the range of 130° C. to 220° C., more preferably in the range of 140° C. to 190° C.

The time for which the noodle strings are exposed to the high-temperature fluid of 130° C. to 220° C. is as short as 5 seconds to 90 seconds in order to avoid overdrying. The exposure time is preferably 5 seconds to 50 seconds.

The particular range of the absolute humidity in the present invention refers to a range of −5% to +10% of the absolute humidity of steam under atmospheric pressure at the intra-chamber temperature of a chamber in which the heating process is carried out. The particular range of the absolute humidity is preferably in the range of −2% to +8% thereof, more preferably in the range of 0% to +8% thereof.

When the absolute humidity to which the surface of the noodle strings is exposed falls within this range, fresh noodle-like texture with the soft surface and the moderately firm cores of the noodle strings is obtained. The absolute humidity requires a special apparatus or the like for +11% or higher of the absolute humidity of steam and is therefore preferably within +10% thereof. On the other hand, −6% or lower of the absolute humidity of steam is not preferred because overdrying might occur.

Examples of the method for adjusting the absolute humidity of the high-temperature fluid include the mixing of the high-temperature fluid with steam, air, inert gas, or the like. In this respect, such a mixed fluid with steam or air may be used after being heated to a temperature that allows the intra-chamber temperature to be maintained. Alternatively, the high-temperature fluid may be heated in advance and then mixed therewith for use. As a result, the intra-chamber temperature for the heating process can be kept constant.

A possible method for elevating the intra-chamber absolute humidity over the absolute humidity of steam under atmospheric pressure at the predetermined temperature is a method of elevating the intra-chamber pressure.

A possible method for elevating the intra-chamber pressure is, for example, a method of rendering a release port in the chamber as narrow as possible and then ejecting a fluid placed under pressure in piping, at a pressure higher than the intra-chamber pressure. In this method, the high-pressure fluid is preferably ejected at a high speed.

The ejection speed of the high-pressure fluid is preferably 2 m/s to 30 m/s, more preferably 4 m/s to 25 m/s, further preferably 6 m/s to 15 m/s. This is probably because the intra-chamber pressure can be elevated by supplying, at a high pressure and a high speed, the fluid in an amount exceeding the upper-limit amount of the fluid that is discharged from the release port in order to bring the intra-chamber atmosphere back to atmospheric pressure. This renders the intra-chamber pressure higher than the atmospheric pressure and can consequently elevate the absolute humidity.

The method for exposing the noodle strings to the high-temperature fluid is carried out by spraying the high-temperature fluid directly or indirectly to the noodle strings or passing the noodle strings through a chamber filled with the high-temperature fluid.

The fluid for use in the heating process is not limited to gas. In this context, the drying refers to a state with a relative humidity lower than 30%.

In the step of carrying out a heating process in the present invention, moisture may be added to the surface of the noodle strings. Examples of the method for adding moisture include misting, showering, dipping, and a condensation phenomenon that occurs when a low-temperature substance is placed in a high-temperature environment. The addition of moisture may be carried out in the chamber for the heating process or may be carried out to the noodle strings temporarily taken out of the chamber for the heating process.

The step of carrying out a heating process may be performed a plurality of times. The second or later step of carrying out a heating process is not particularly limited, and an existing technique, such as a steaming process using saturated steam or boiling in a boiling chamber, can also be used. The conditions therefor may involve, for example, steaming for about 1 to 3 minutes using saturated steam. The step of adding moisture is preferably performed between the respective steps of carrying out a heating process. Examples of the moisture adding step include a showering method and a dipping method in a water bath.

The temperature of water or hot water for the showering or the dipping is preferably high. Specifically, 40° C. or higher is preferred. Particularly, 50° C. or higher is most preferred. A small amount of a seasoning, an emulsifier, an anti-binding agent, or the like may be added to or dissolved in the water used. The amount of the water added is preferably 5% to 30% with respect to the weight of the noodle strings before the heating process.

(Drying Step)

The noodle strings that have finished the step of carrying out a heating process are finally subjected to a drying step so that the noodle strings are dried to prepare instant noodles. Before being subjected to the drying step, the noodle strings are usually cut into one meal amount (by weight) and packed in a retainer or the like. The noodle strings in this packed state is subjected to the drying step. Alternatively, the noodle strings may be cut prior to carrying out the heating process mentioned above.

In the present invention, the type of the drying step is not particularly limited, and a drying process generally used in the production of instant noodles can be applied thereto. Specific examples thereof include a fry drying process as well as non-fry drying processes such as a hot-air drying process, a vacuum freeze drying process, microwave drying, and low-temperature air drying. The drying step can also be carried out by a combination of these processes.

The instant noodles produced by the method described above had fresh noodle-like flavor and texture while having a good reconstitutability.

The instant noodles of the present invention can be used as instant cup noodles that become ready to serve only about 3 to 5 minutes after pouring of boiling water, or for about 1 to 3 minutes. In either case, the instant noodles of the present invention can offer an excellent reconstitutability and noodle quality. Also, the instant noodles of the present invention are applicable to both thick noodles and thin noodles.

EXAMPLES

Hereinafter, the present invention will be described in detail with reference to Examples. However, the present invention is not intended to be limited by these Examples.

Experiment 1

Example 1

340 ml of kneading water in which 15 g of salt and 6 g of sodium carbonate were dissolved was added to 1 kg of noodle material powder consisting of 900 g of wheat flour and 100 g of starch. This mixture was adequately kneaded using a mixer to obtain a noodle dough. The obtained noodle dough was shaped and combined to form a noodle belt. The noodle belt was repeatedly rolled out to become the noodle belt having a final thickness of 1.2 mm. The noodle belt was then cut with a cutting blade of a round blade No. 20.

The cut raw noodle strings were subjected to a heating process with a high-temperature fluid. The conditions of the heating process involved treating the noodle strings by exposure to a high-temperature fluid having a temperature of 140° C., an absolute humidity of 550 g/m^3, and a wind speed of 9 m/s for 60 seconds. In this operation, the absolute humidity was 103% of the absolute humidity of steam under atmospheric pressure at 140° C.

The chamber for the heating process included the ejection holes configured to spray the high-temperature fluid from upper and lower sides of the net conveyor to the noodle strings transferred on the net conveyor. Many such ejection holes were arranged in a proceeding direction of the conveyor. The heating process of the noodle strings was carried out by spraying the high-temperature fluid from the ejection holes to the noodle strings.

The temperature and the absolute humidity of the high-temperature fluid to which the noodle strings were exposed were measured by mounting temperature and humidity sensors in the chamber to measure the temperature and the absolute humidity of the high-temperature fluid to which the noodle strings were exposed in the chamber.

The noodles thus treated by the heating process were cut, and then one meal amount (100 g) of the resulting noodle strings was filled in a retainer for drying and dried for 20 minutes in a hot air drier having a temperature of 90° C. and a wind speed of 4 m/s. The instant non-fried noodles thus produced were cooled down and stored as a sample of Example 1.

Example 2

A sample of Example 2 was prepared in the same way as in Example 1 except that the high-temperature fluid had an absolute humidity of 520 g/m^3. In this operation, the absolute humidity was 97% of the absolute humidity of steam under atmospheric pressure at 140° C.

Example 3

A sample of Example 3 was prepared in the same way as in Example 1 except that the high-temperature fluid had a temperature of 170° C. and an absolute humidity of 530 g/m^3. In this operation, the absolute humidity was 106% of the absolute humidity of steam under atmospheric pressure at 170° C.

Example 4

A sample of Example 4 was prepared in the same way as in Example 1 except that the high-temperature fluid had a temperature of 170° C. and an absolute humidity of 490 g/m^3. In this operation, the absolute humidity was 97% of the absolute humidity of steam under atmospheric pressure at 170° C.

Comparative Example 1

A sample of Comparative Example 1 was prepared in the same way as in Example 1 except that the high-temperature fluid for Example 1 had an absolute humidity of 480 g/m^3. In this operation, the absolute humidity was 90% of the absolute humidity of steam under atmospheric pressure at 140° C.

Comparative Example 2

A sample of Comparative Example 2 was prepared in the same way as in Example 3 except that the high-temperature fluid for Example 3 had an absolute humidity of 450 g/m^3. In this operation, the absolute humidity was 90% of the absolute humidity of steam under atmospheric pressure at 170° C.

Comparative Example 3

These Examples involved the step of carrying out a heating process using a high-temperature fluid. A sample of Comparative Example 3 was prepared in the same way as in Example 1 except that the high-temperature fluid was changed to saturated steam. In this operation, the temperature was 100° C., and the absolute humidity was 582 g/m^3.

These samples of Examples 1 to 4 and Comparative Examples 1 to 3 were each cooked by heating for 3 minutes in 500 ml of boiling water in a pot for reconstitution and then eaten. The method for evaluating the noodles on eating them was as follows: the noodles were evaluated by five experienced panelists and studied for texture and flavor while the comprehensive evaluation was performed on a scale on which 4 was perfection.

The scores of the comprehensive evaluation were as follows: 4: both reconstitution and texture were good; 3: either reconstitution or texture was not sufficient; 2: both reconstitution and texture were slightly poor; and 1: both reconstitution and texture were poor. The highest score 4 was appraised as a passing score that allowed general consumers to sufficiently recognize distinctive effects brought about by the absolute humidity as compared with conventional products.

The results about Examples 1 to 4 and Comparative Examples 1 to 3 are shown in Table 1.

TABLE 1

| | Evaluation | Remarks |
| --- | --- | --- |
| Example 1 | 4 | Both reconstitution and texture were good with wheat flavor. |
| Example 2 | 3 | The core slightly remained with wheat flavor. |
| Example 3 | 4 | Both reconstitution and texture were good with wheat flavor. |

TABLE 1-continued

| | Evaluation | Remarks |
|---|---|---|
| Example 4 | 3 | Both reconstitution and texture were good with wheat flavor. |
| Comparative Example 1 | 1 | The sample tasted insufficiently cooked and chalky without wheat flavor. |
| Comparative Example 2 | 1 | The sample tasted insufficiently cooked and chalky without wheat flavor. |
| Comparative Example 3 | 1 | The sample tasted insufficiently cooked and chalky without wheat flavor. |

Experiment 2

Example 5

340 ml of kneading water in which 15 g of salt and 6 g of sodium carbonate were dissolved was added to 1 kg of noodle material powder consisting of 900 g of wheat flour and 100 g of starch. This mixture was adequately kneaded using a mixer to obtain a noodle dough. The obtained noodle dough was shaped and combined to form a noodle belt. The noodle belt was repeatedly rolled out to become the noodle belt having a final thickness of 1.2 mm. The noodle belt was then cut with a cutting blade of a round blade No. 20.

The cut raw noodle strings were subjected to a heating process with a high-temperature fluid. The conditions of the heating process involved treating the noodle strings by exposure to a high-temperature fluid having a temperature of 170° C., an absolute humidity of 530 g/m^3, and a wind speed of 9 m/s for 30 seconds.

The noodles thus treated by the heating process were dipped for 5 seconds in a dipping bath containing hot water of 60° C. Subsequently, the heating process with the high-temperature fluid was carried out again under the same conditions as above.

The noodles thus treated by the heating process were cut, and then one meal amount (140 g) of the resulting noodle strings was filled in a retainer for drying and dried for 20 minutes in a hot air drier having a temperature of 90° C. and a wind speed of 4 m/s. The instant non-fried noodles thus produced were cooled down and stored as a sample of Example 5.

This ample was cooked by heating for 3 minutes in 500 ml of boiling water in a pot for reconstitution and then eaten. The resulting noodles had good fresh noodle-like flavor and texture, unlike conventional instant noodles.

INDUSTRIAL APPLICABILITY

According to the present invention, dried noodles having excellent fresh noodle-like flavor and texture can be produced.

The present application is based on Japanese Patent Application No. 2013-245893 filed on Nov. 28, 2013, the contents of which are incorporated herein by reference.

The invention claimed is:

1. A method for producing instant noodles, comprising:
heating raw noodle strings in a chamber at an intra-chamber temperature in a range from 130° C. to 220° C. by exposing the raw noodle strings to high-temperature fluid comprising steam; and
drying the noodle strings after the heating,
wherein the heating is carried out in the chamber, adjusting absolute humidity in an atmosphere in the chamber to be in a range from −5% to +10% of absolute humidity of the steam at the intra-chamber temperature under atmospheric pressure,
wherein the absolute humidity is an amount of water vapor present in one m$^3$ of the atmosphere or in one m$^3$ of the steam, and is expressed in a unit of g/m$^3$.

2. A method for producing instant noodles comprising:
making noodle dough comprising raw material powder, one or more auxiliary raw materials, and water;
cutting the noodle dough so as to form raw noodle strings;
heating the cut raw noodle strings by exposing the raw noodle strings to high-temperature fluid comprising steam; and
drying the noodle strings after the heating,
wherein the heating is performed a plurality of times, and the heating for a first time is performed in a chamber at an intra-chamber temperature in a range from 130° C. to 220° C., adjusting absolute humidity in an atmosphere in the chamber to be in a range from −5% to +10% of absolute humidity of the steam at the intra-chamber temperature under atmospheric pressure,
wherein the absolute humidity is an amount of water vapor present in one m$^3$ of the atmosphere or in one m$^3$ of the steam, and is expressed in a unit of g/m$^3$.

3. The method for producing instant noodles according to claim 1, wherein a time of the heating is in a range from 5 seconds to 90 seconds.

4. The method for producing instant noodles according to claim 2, wherein a time of the heating is in a range from 5 seconds to 90 seconds.

5. The method for producing instant noodles according to claim 1, wherein the high-temperature fluid further comprises high-temperature air, or inert gas, or a mixture thereof.

6. The method for producing instant noodles according to claim 1, wherein the absolute humidity of the high-temperature fluid is in the range of 490-550 g/m$^3$.

7. The method for producing instant noodles according to claim 2, wherein the high-temperature fluid further comprises air, or inert gas, or a mixture thereof.

8. The method for producing instant noodles according to claim 2, wherein the absolute humidity of the high-temperature fluid is in the range of 490-550 g/m$^3$.

9. The method for producing instant noodles according to claim 2, wherein the one or more auxiliary raw materials are selected from the group consisting of Kansui, salt, a thickener, gluten, albumen, a dye, vitamin, calcium, and combinations thereof.

* * * * *